(12) United States Patent  
Staples

(10) Patent No.: US 8,628,106 B2
(45) Date of Patent: Jan. 14, 2014

(54) BOAT COUPLING

(71) Applicant: Indigo Sierra Pty Ltd, Hastings (AU)

(72) Inventor: Gregory Staples, Hastings (AU)

(73) Assignee: Indigo Sierra Pty Ltd (AU)

(*) Notice: Subject to any disclaimer, the term of this patent is extended or adjusted under 35 U.S.C. 154(b) by 0 days.

(21) Appl. No.: 13/770,339

(22) Filed: Feb. 19, 2013

(65) Prior Publication Data

US 2013/0207368 A1 Aug. 15, 2013

Related U.S. Application Data

(63) Continuation of application No. 13/140,620, filed as application No. PCT/AU2009/001650 on Dec. 18, 2009, now Pat. No. 8,408,578.

(30) Foreign Application Priority Data

Dec. 18, 2008 (AU) ................................ 2008906513

(51) Int. Cl.
B60D 1/00 (2006.01)
(52) U.S. Cl.
USPC ........................................................ 280/504
(58) Field of Classification Search
USPC ............................................. 280/414.1, 504
See application file for complete search history.

(56) References Cited

U.S. PATENT DOCUMENTS

| 3,963,263 A | | 6/1976 | Whitlock |
|---|---|---|---|
| 3,989,267 A | * | 11/1976 | Robinson .................... 280/414.1 |
| 4,545,596 A | * | 10/1985 | Luke et al. ...................... 280/509 |
| 5,120,079 A | * | 6/1992 | Boggs ......................... 280/414.1 |
| 5,193,835 A | * | 3/1993 | Sheets ......................... 280/414.1 |
| 5,263,733 A | * | 11/1993 | Kastenberger et al. ..... 280/414.1 |
| 5,599,035 A | * | 2/1997 | Spence ....................... 280/414.1 |
| 5,921,699 A | * | 7/1999 | Olson ......................... 403/322.1 |
| 6,135,481 A | * | 10/2000 | Bishop et al. ............... 280/414.1 |
| 2007/0210559 A1 | * | 9/2007 | Yasmine ........................ 280/504 |

FOREIGN PATENT DOCUMENTS

| AT | 393655 T | 5/2008 |
|---|---|---|
| DE | 3540641 A1 | 5/1987 |
| DE | 4133610 A1 | 5/1992 |
| EP | 0578073 A1 | 1/1994 |

OTHER PUBLICATIONS

International Search Report, PCT/AU2009/001650, dated Feb. 3, 2010.

* cited by examiner

Primary Examiner — Tashiana Adams
(74) Attorney, Agent, or Firm — Lerner, David, Littenberg, Krumholz & Mentlik, LLP

(57) ABSTRACT

A boat coupling including a jaw for receiving an eye which is attached to the hull of a boat. A pin is movable to bridge across the jaw to capture the eye between extended and retracted positions. A retaining arrangement for retaining the pin in the retracted position will release the pin upon the pin being shifted to a release position, where after the pin is moveable under a biasing influence to shift to the extended position 16 Claims, 9 Drawing Sheets

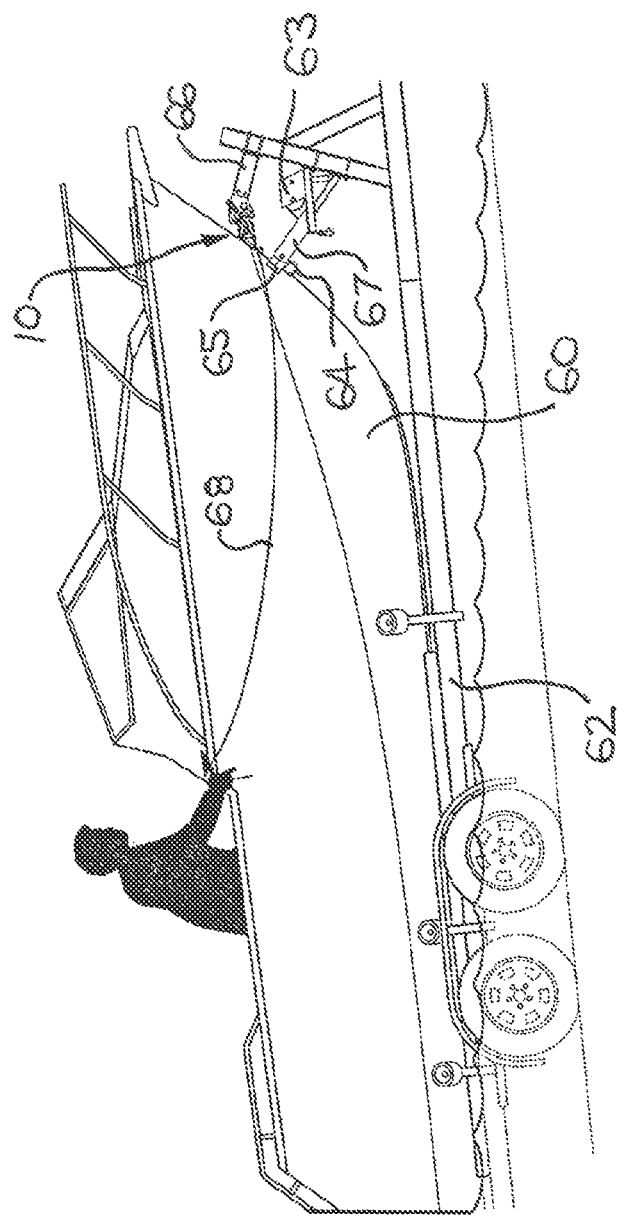

BOAT COUPLING

CROSS REFERENCE TO RELATED APPLICATIONS

This application is a continuation of U.S. patent application Ser. No. 13/140,620, filed on Jun. 17, 2011, which application is a national phase entry under 35 USC §371 of International Application No. PCT/AU2009/001650, filed Dec. 18, 2009, which claims the benefit of Australian Patent Application No. 2008906513, filed Dec. 18, 2008. The entire disclosures of each of the above-identified applications are incorporated by reference herein.

FIELD OF THE INVENTION

The present invention relates to a boat coupling for securing the hull of a boat, typically small to medium size pleasure and commercial boats, to a trailer.

BACKGROUND OF THE INVENTION

Small to medium size pleasure and commercial boats are often towed by car or truck on a boat trailer to a launch site or ramp. The boat is normally secured to the trailer by a winch and cable arrangement which engages an eye which is attached to the boat hull, most often at the bow or middle bow section of the hull. Various couplings have been devised for securing a boat to a trailer, however typically these are of complex construction and/or require an operator to operate the coupling at or in the immediate vicinity of the coupling and this can mean that when a boat is being launched into or removed from the water, the operator must enter the water to connect or disconnect the coupling between the boat and the trailer. This is inconvenient and usually leaves at least the feet and lower legs of the operator wet. Also, it usually means that during launching of a boat into the water, two persons are required, one to operate the boat and the other to release the coupling.

Various attempts have been made to relieve the need for the coupling operator to be positioned at or in the immediate vicinity of the coupling, when latching or releasing of the boat relative to the trailer is undertaken. U.S. Pat. No. 3,963,263 discloses an automatic boat trailer latch which includes two pivotable strikers that are engaged by an eye attached to the boat hull during attachment of the boat to the trailer and which pivot to create an opening through which the eye can pass. Once the eye is past the strikers, the strikers can return under the influence of springs, to a position in which release of the eye past the strikers is prevented by the strikers. Thus, the eye is captured by the strikers and the boat is secured to the trailer. To release the eye from the strikers, the strikers are manually rotated to create the opening mentioned above, to allow passage of the eye past the strikers. While the latch arrangement of U.S. Pat. No. 3,963,263 can securely capture the eye, the arrangement has several disadvantages. One disadvantage is that the boat operator is required to very precisely manoeuvre the boat to align the eye for passage past the strikers. There is because the latch has a very small point of entry so that there is very little tolerance for misalignment. This is very difficult in practice because boats move around considerably on the water during boat retrieval and boat launch angles vary considerably. Accordingly, it would be expected that the latch of this patent would result in many failed retrieval attempts.

In addition, in the captured condition of the eye within the latch, the eye is in contact with the structure of the latch and this will impose loads on the eye when the boat is being trailed, which will transfer to the boat hull. Moreover, the latch has exposed springs which can be dangerous, the overall construction appears to less robust than desirable, and there is not a simple release arrangement for release of the eye.

U.S. Pat. No. 5,193,835 discloses another form of automatic boat trailer latch which includes a spring loaded locking pin which has retracted and extended positions and which is engaged by a spring loaded blocking pin in the retracted position, to prevent the locking pin from moving to the extended position. The blocking pin is connected to a trigger which is engaged by the eye of a boat when the boat is moved onto a trailer and movement of the trigger causes the blocking pin to be shifted out of engagement with the locking pin. This releases the locking pin to the extended position through the eye, so securing the boat to the trailer. A drawback with this arrangement is the complex fabricated construction which is labour intensive to manufacture and not conducive to mass production. This arrangement also suffers from having a very small point of entry, so that it will be difficult to align the eye attached to the hull for entry into the latch. Because of this, the eye is likely to engage the latch housing during a retrieval operation and cause the housing to bend or break. Also, there is not a simple release arrangement for release of the eye.

In general, the couplings known to the applicant for the purpose discussed above are either of poor design and therefore costly and subject to a greater likelihood of failure, or are simple and less useful. Accordingly, the applicant considers it desirable to provide a boat coupling that is of relatively simple and robust construction, that is reliable and able to withstand heavy impacts that occur from time to time. The applicant also considers it desirable to provide a boat coupling that is operable remotely, so that the driver or an occupant of a vehicle to which the boat trailer is attached, or the driver or an occupant of the boat, can operate the coupling from within the vehicle or boat, preferably without having to shift either from the driver's seat of the vehicle or from the driver's position in the boat. The ability for the boat driver to release the boat remotely is particularly useful, given that the launch of a boat can then be a single person operation rather than requiring at least two persons.

SUMMARY OF THE INVENTION

The present invention provides a boat coupling which includes:
  i a jaw for receiving an eye which is attached to the hull of a boat,
  ii a pin which is movable between an extended position in which it bridges across the jaw to capture the eye and a retracted position in which the jaw is open for release of the eye,
  iii a retaining arrangement for retaining the pin in the retracted position, the retaining arrangement releasing the pin upon the pin being shifted to a release position whereafter the pin shifts to the extended position.

The jaw can take any suitable form such as a V or U shaped form. Typically, the eye which is attached to the boat hull will form a closed loop and the jaw will define an opening of sufficient depth and width to receive the eye and for the pin to extend through the loop in the extended pin position. The jaw can be shaped to guide the eye into the opening such as by inclined and mutually converging surfaces, against which the eye can slide. It will be appreciated that insertion of the eye into the jaw opening relies on correct positioning of the boat relative to the boat coupling and this can be difficult, particularly in rough conditions. Accordingly, the provision of guide surfaces can be highly advantageous.

The jaw can be formed from any suitable metal, such as iron or aluminium, or from suitable plastic. The jaw can be cast or fabricated.

The pin can be of any suitable shape. An elongate pin can be employed of any suitable cross-section, such as circular. Square, hexagonal or other non-circular cross-sectional shapes can be employed if required.

The pin can be formed from any suitable metal, such steel or brass, or even plastic.

The pin can be located within a bore formed in a housing. The jaw can be formed as part of the housing. The housing and the jaw can be integrally formed, such as in a single casting.

The pin can be movable along its lengthwise axis between the retracted position and the extended position. The pin can be guided within the bore for that movement. The axis of the pin is envisaged to be oriented substantially horizontally when the boat coupling is installed.

The pin can be shifted from the retracted position to the release position against the influence of a biasing arrangement. Thus, the biasing arrangement is operable to resist inadvertent movement of the pin to the release position from the retracted position and thus resist inadvertent release of the pin for movement to the extended position. The pin can also be shifted from the release position to the extended position under the influence of a biasing arrangement and to move to the retracted position against the influence of that biasing arrangement.

The boat coupling can include a retracting arrangement for retracting the pin to the retracted position. In absence of a retracting arrangement, the pin can be retracted by pushing the pin with a suitable tool, or even by finger pressure. However if a retracting arrangement is provided, the arrangement can include a drive member for engaging the pin and for driving the pin from the extended position to the retracted position. The drive member can be rotatable to drive the pin in this manner. The drive member can be connected to an actuator to drive the drive member to rotate. The actuator can be an arm. The advantage of this arrangement is that the arm can be of a length suitable to reduce the effort required to shift the pin to the retracted position. The drive member can be positioned within the housing with the actuator extending outside the housing for manual access.

The drive member can engage the pin in the retracted position to retain the pin in that position. The drive member can include an engagement portion for engaging the pin, with one of the engagement portion and the pin having a recess and the other having a protrusion. In the engaged condition of the drive member and the pin, the protrusion extends into the recess. This arrangement can be such that with the engagement portion engaged with the pin, the drive member and the pin jam, thus preventing the pin from moving from the retracted position in a direction towards the extended position. Where the drive member is rotatable, this arrangement jams the drive member against rotation in a direction that would drive the pin towards the extended position.

In the above arrangement, movement of the pin from the retracted position to the release position causes the protrusion to be displaced from the recess so that the drive member and the pin are no longer jammed together. Following this, the pin can be driven by the drive member from the retracted position to the extended position.

The protrusion can be formed by a free end portion of a wall of a recess which is formed in the pin. The recess can be formed at the trailing end of the pin.

The drive member can be biased to rotate in a direction to drive the pin toward the extended position and the drive member can be coupled to the pin so that upon the pin being shifted to the release position, the drive member then drives the pin to the extended position. Advantageously, the arrangement can be such that rotational movement of the drive member can cause linear movement of the pin. The drive member can be arranged to shift the pin in either direction between the retracted position and the extended position. Alternatively, a second drive member can drive the pin towards the retracted position from the extended position.

In some arrangements, the pin can include a recess and the drive member can engage within the recess to drive the pin between the extended position and the retracted position. The drive member can engage a first surface of the recess to drive the pin towards the extended position and a second surface of the recess to drive the pin towards the retracted position. The first and second surfaces can be spaced apart along the axis of the pin and can be opposed or facing surfaces.

Other mating recess and protrusion arrangements are possible and within the scope of the invention, as are other drive arrangements to drive the pin between the retracted and extended positions.

For a better understanding of the invention and to show how it may be performed, embodiments thereof will now be described, by way of non-limiting example only, with reference to the accompanying drawings.

BRIEF DESCRIPTION OF THE FIGURES

FIGS. 8 and 9 show the boat coupling of FIG. 1 attached to a boat.

DETAILED DESCRIPTION OF THE FIGURES

Figure 1:
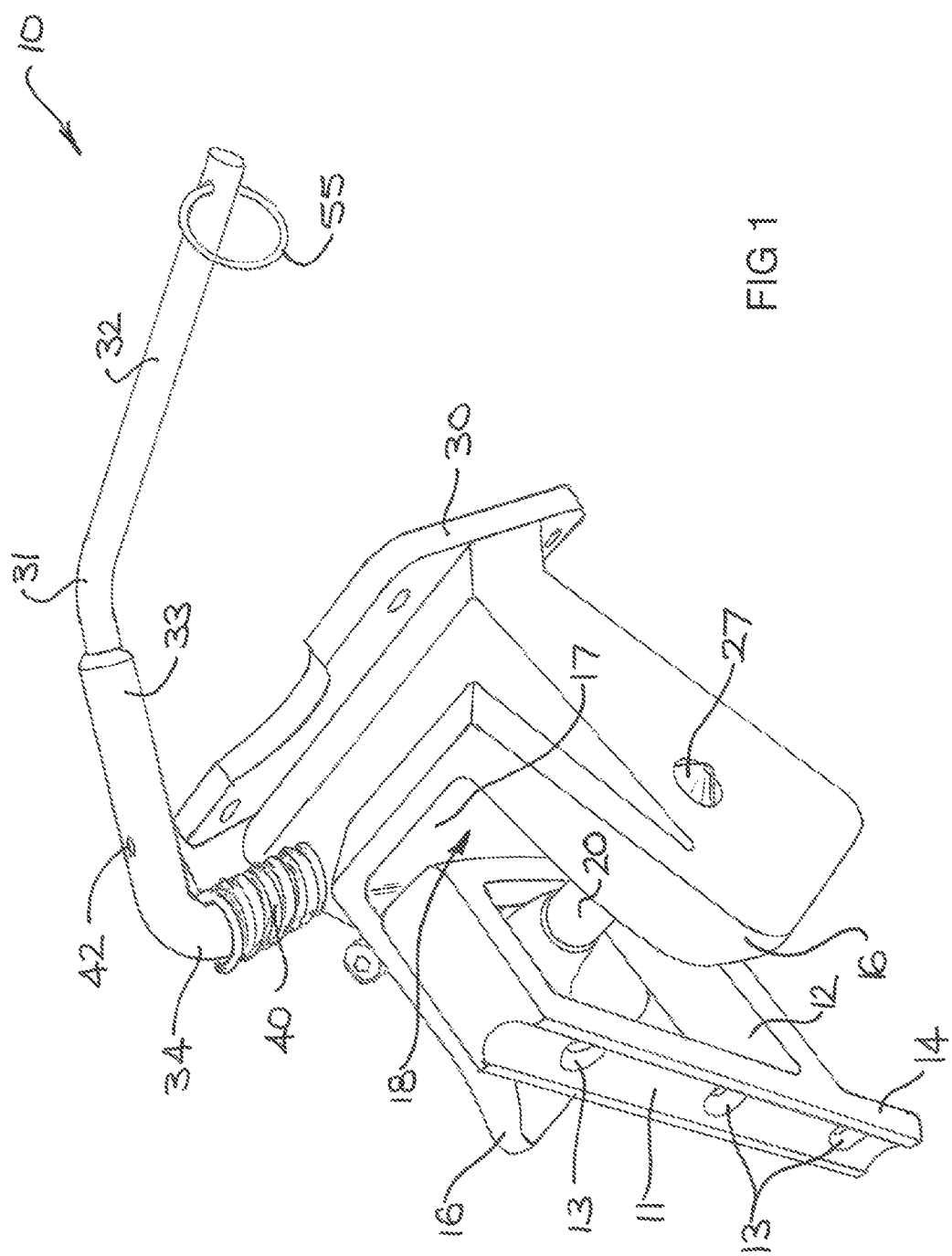
FIG. 1 shows a boat coupling according to the invention engaged with an eye.

FIG. 1 shows a boat coupling 10 according to one embodiment of the invention. The boat coupling 10 is shown in FIG. 1 as being coupled to an eye 11, which normally would be fixed to the hull of a boat (not shown). The eye 11 forms a closed loop 12 and includes three openings 13 along a portion 14 thereof through which fastening bolts or screws can extend for fastening the eye 11 to the boat hull.

The boat coupling 10 would be fitted to a mount on a boat trailer and includes a jaw 15 which is formed in a U-shape, defining a pair of jaw arms 16 and a base 17. The jaw 15 defines an opening 18 which is sufficient in width and depth, to accept the eye 11 in a position to enable the pin 20 of the coupling 10 to extend through the loop 12.

Figure 2:
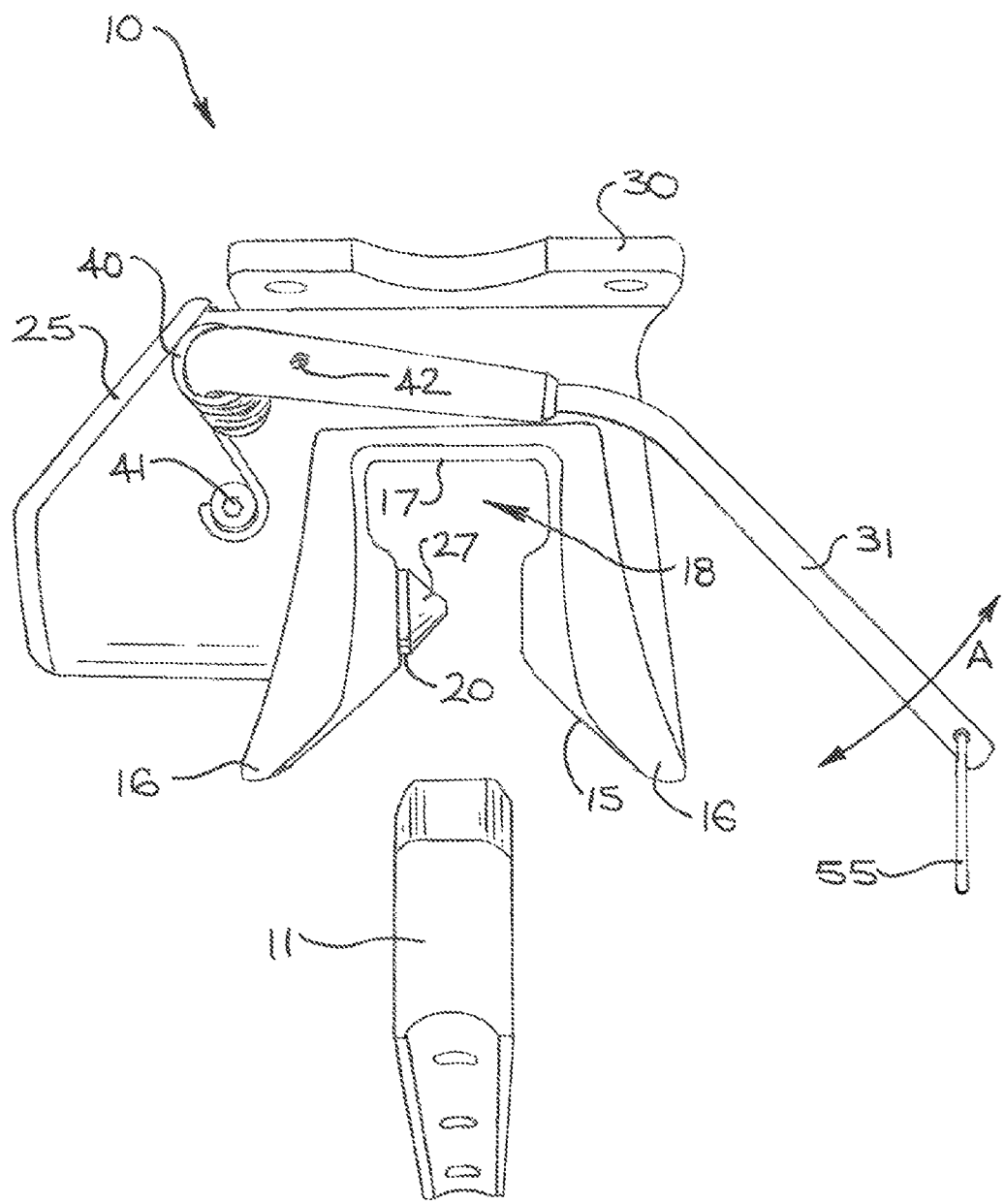
FIG. 2 is a side view of the boat coupling of FIG. 1, with the pin retracted and the eye displaced.

FIG. 2 shows the coupling 10 in plan view and shows the eye 11 spaced from the jaw 15 of the coupling 10. FIG. 2 also shows the pin 20 in a retracted position, which allows insertion of the eye 11 into the opening 18 of the jaw 15 to the position shown in FIG. 1. In the position of FIG. 2, the pin 20 can be extended to capture the eye 11 within the jaw 15. The inside surfaces of the jaw arms 16 are inclined for guiding the eye 11 into the opening 18.

Figure 3:
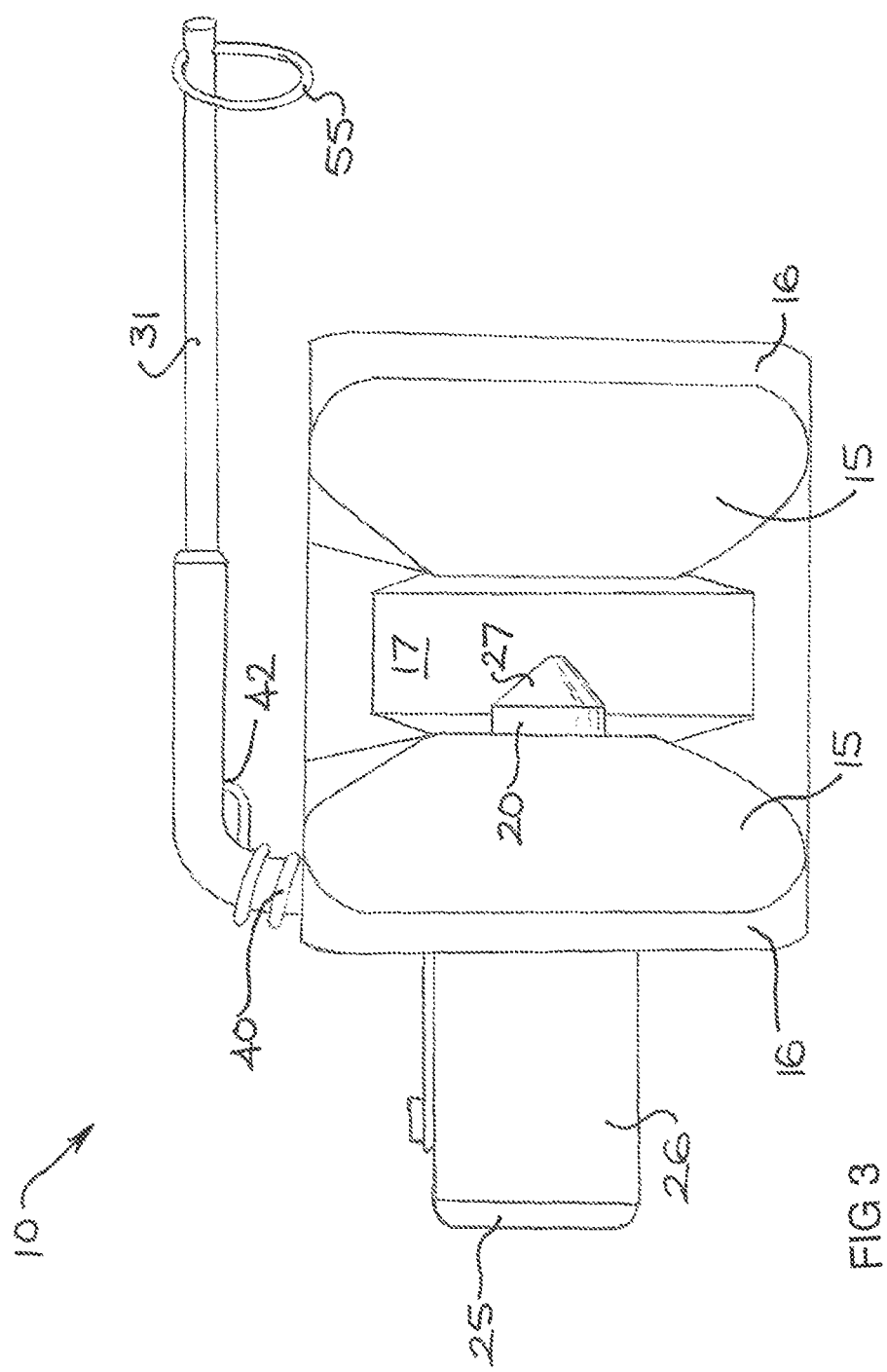
FIG. 3 is a view of the boat coupling of FIG. 2, rotated through 90°.

FIG. 3 is a view of the coupling 10, but shown rotated through 90° from the FIG. 2 orientation. In FIG. 3, the pin 20 remains in the retracted position shown in FIG. 2.

Figure 4:
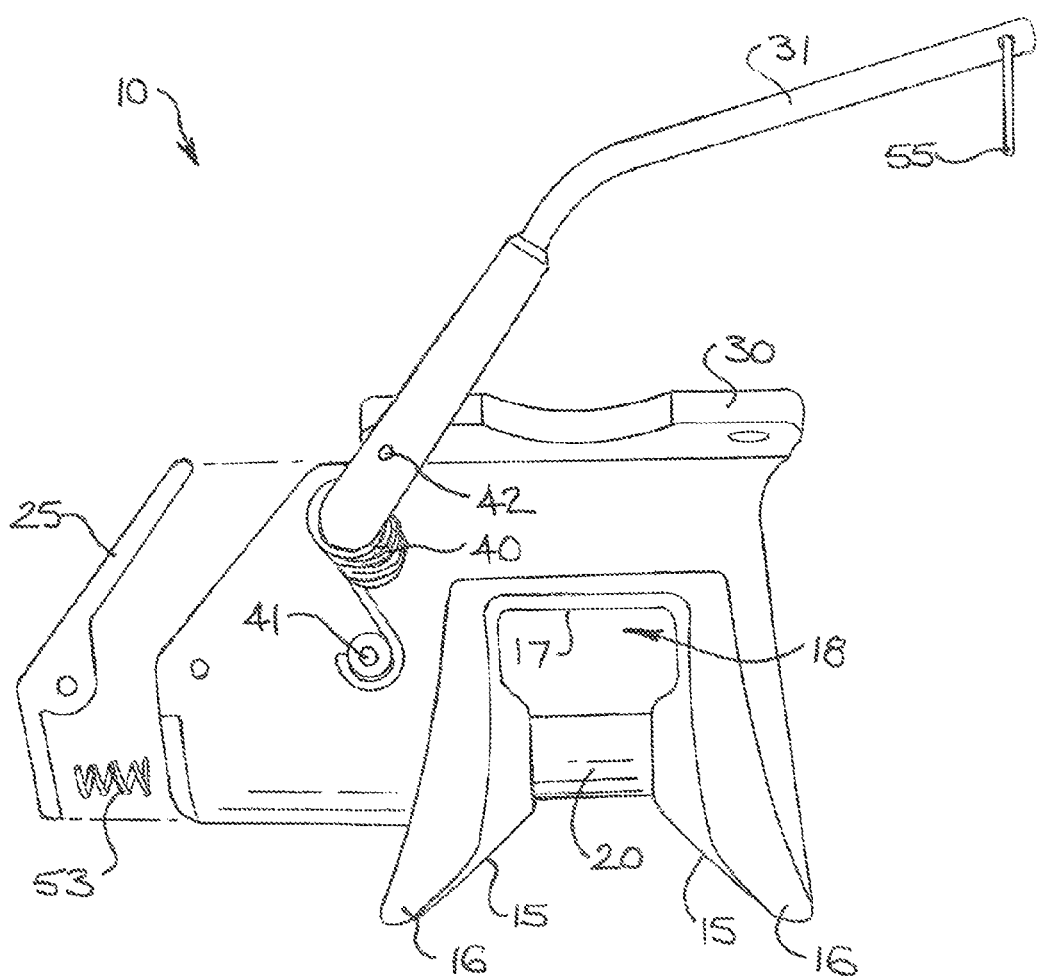
FIG. 4 is a side view of the boat coupling of FIG. 1, with the pin extended and the eye displaced.

FIG. 4 is a similar view to that shown in FIG. 2, except that the pin 20 is shown in an extended position. Additionally, an end cap 25 of the coupling 10 is shown separated from the housing 26 of the coupling 10.

The pin 20 of the figures is an elongate rod of generally circular cross-section. The leading end 27 of the pin 20 is tapered or conical (see FIGS. 1 to 3), while the other end is obscured in FIGS. 1 to 4 and will be described later herein in relation to FIGS. 5 to 7.

The coupling 10 includes a mounting plate 30, which is provided for mounting the coupling 10 to a boat trailer or the like. The mounting plate 30 simply includes four openings for the passage of fastening bolts to fasten the boat coupling 10 to a mount of a trailer.

The coupling 10 includes a retracting arrangement for retracting the pin 20 from the extended position shown in FIGS. 1 and 4, to the retracted position shown in FIGS. 2 and 3. The retracting arrangement includes an actuating arm 31 which is rotatable through an arc shown by the arrow A in FIG. 2. Rotation is about an axis which extends perpendicular to the lengthwise axis of the pin 20. This is best illustrated in FIG. 1, in which the arm 31 is shown as having three sections 32 to 34 with the axis of rotation being about the axis of the section 34. The sections 32 and 33 are angled relative to each other, although the angle can vary depending on the application of the coupling 10 and in fact no angle between these sections need necessarily be provided. Thus, in an alternative arrangement, the sections 32 and 33 can extend along the same axis.

A bias spring 40 is anchored to the housing 26 at a projection 41 and to the arm section 33, by engagement in an opening 42 formed in that section. By anchoring the spring 40 at the projection 41 and the opening 42, the arm 31 can be biased towards anti-clockwise movement when viewed in the orientation shown in FIG. 2. As will be explained below, biasing of the arm 31 in that direction is such as to drive the pin 20 to the extended position, when the pin 20 is released for movement to that position.

By linking or connecting the arm 31 to the pin 20, through a linking or connecting arrangement disposed within the housing 26, upon the pin 20 being released from the retracted position shown in FIG. 2, the biasing influence which is applied to the arm 31 by the spring 40, can be used to cause the pin 20 to move quickly, or abruptly, to the extended position shown in FIGS. 1 and 4. The pin can therefore be arranged to snap into the extended position as soon as the eye enters the opening 18 of the jaw 15.

Moreover, the entry of the eye into a position between the jaw arms 16 can be employed to shift the pin 20 to the release position, to thereafter move to the extended position. This provides for a very simple coupling construction with minimum components and is discussed in detail below, in relation to FIGS. 5 to 7.

Figure 5:
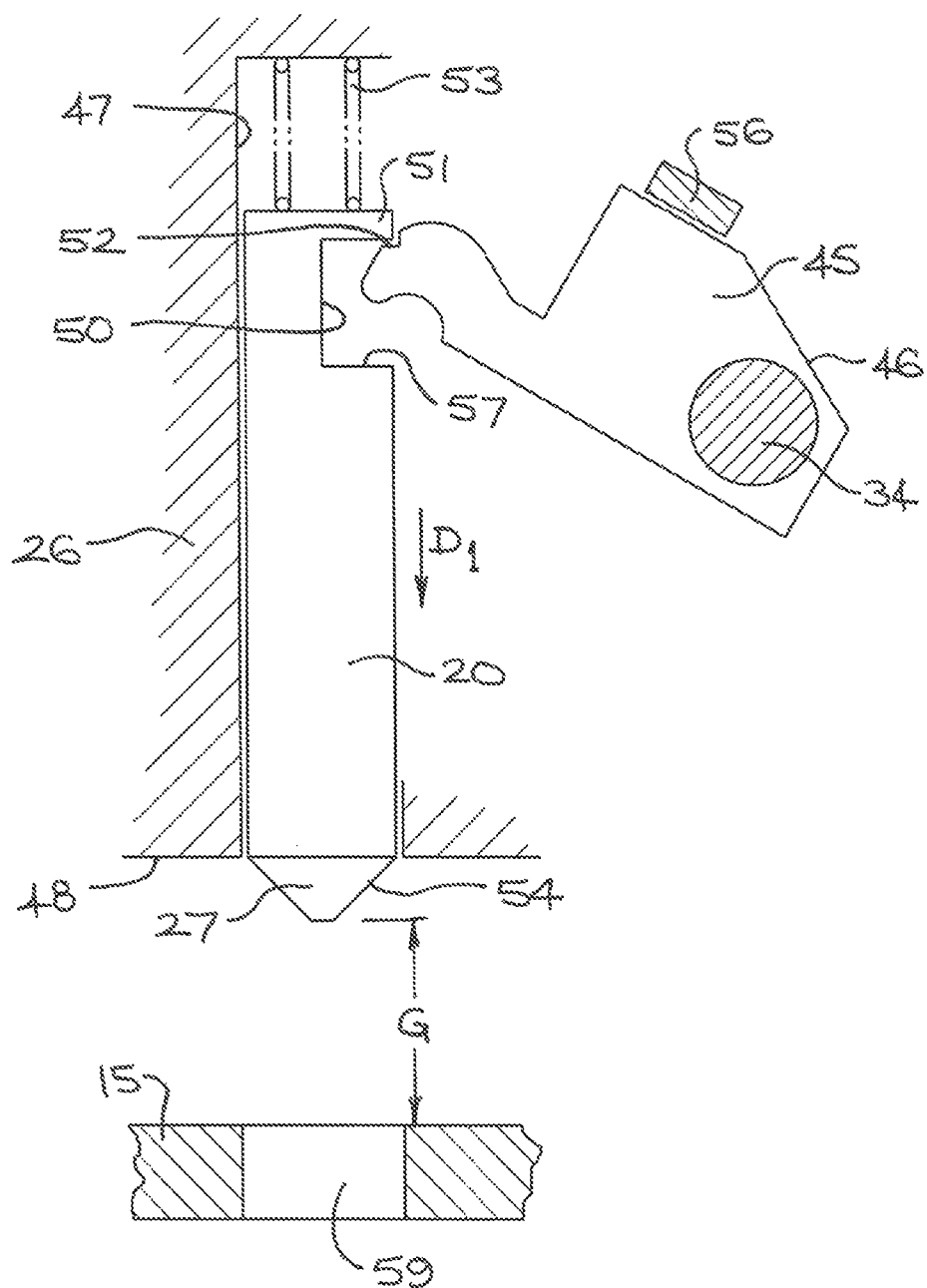
FIGS. 5 to 7 show the sequence of movement of the pin from the retracted position to the extended position.
Figure 6:
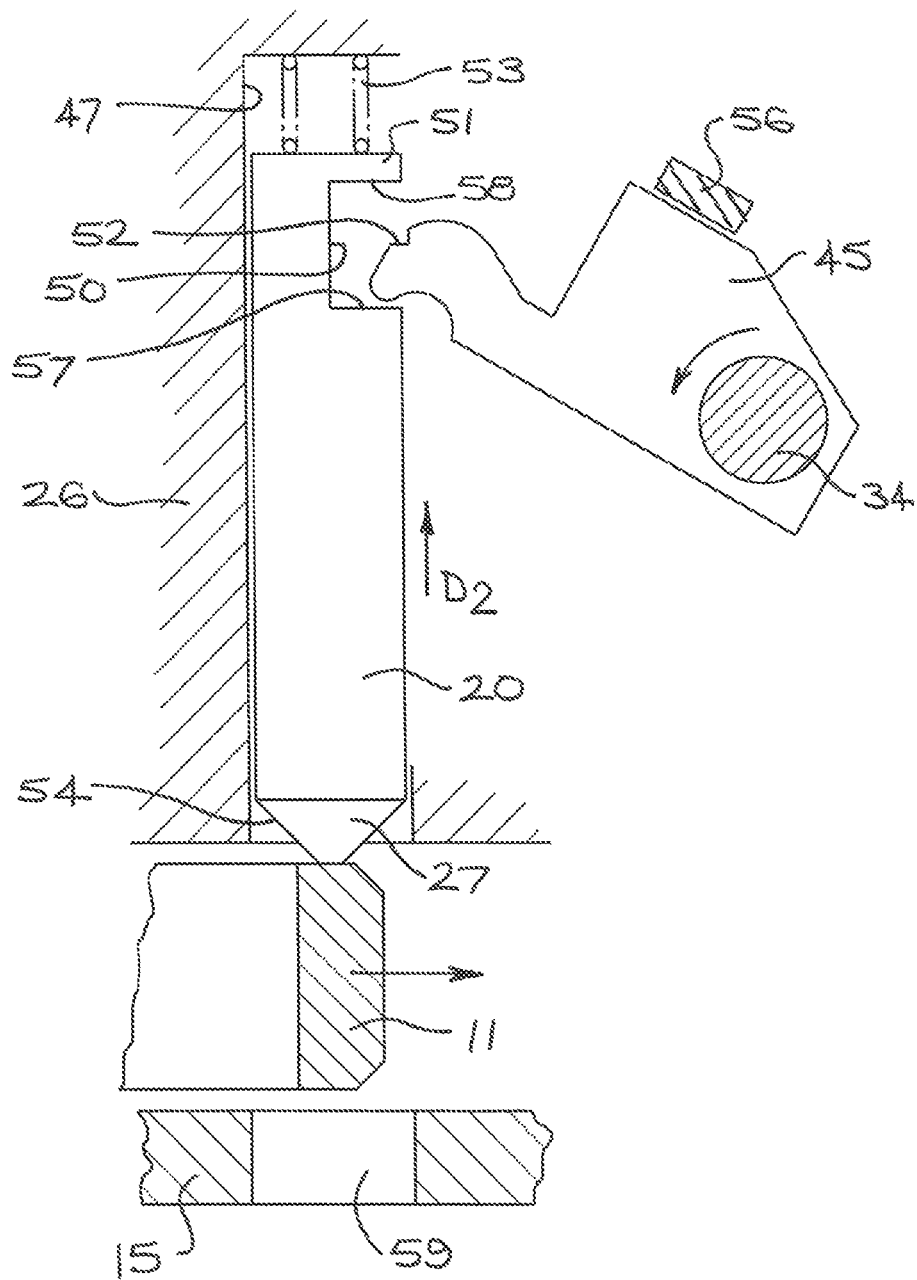
Figure 7:
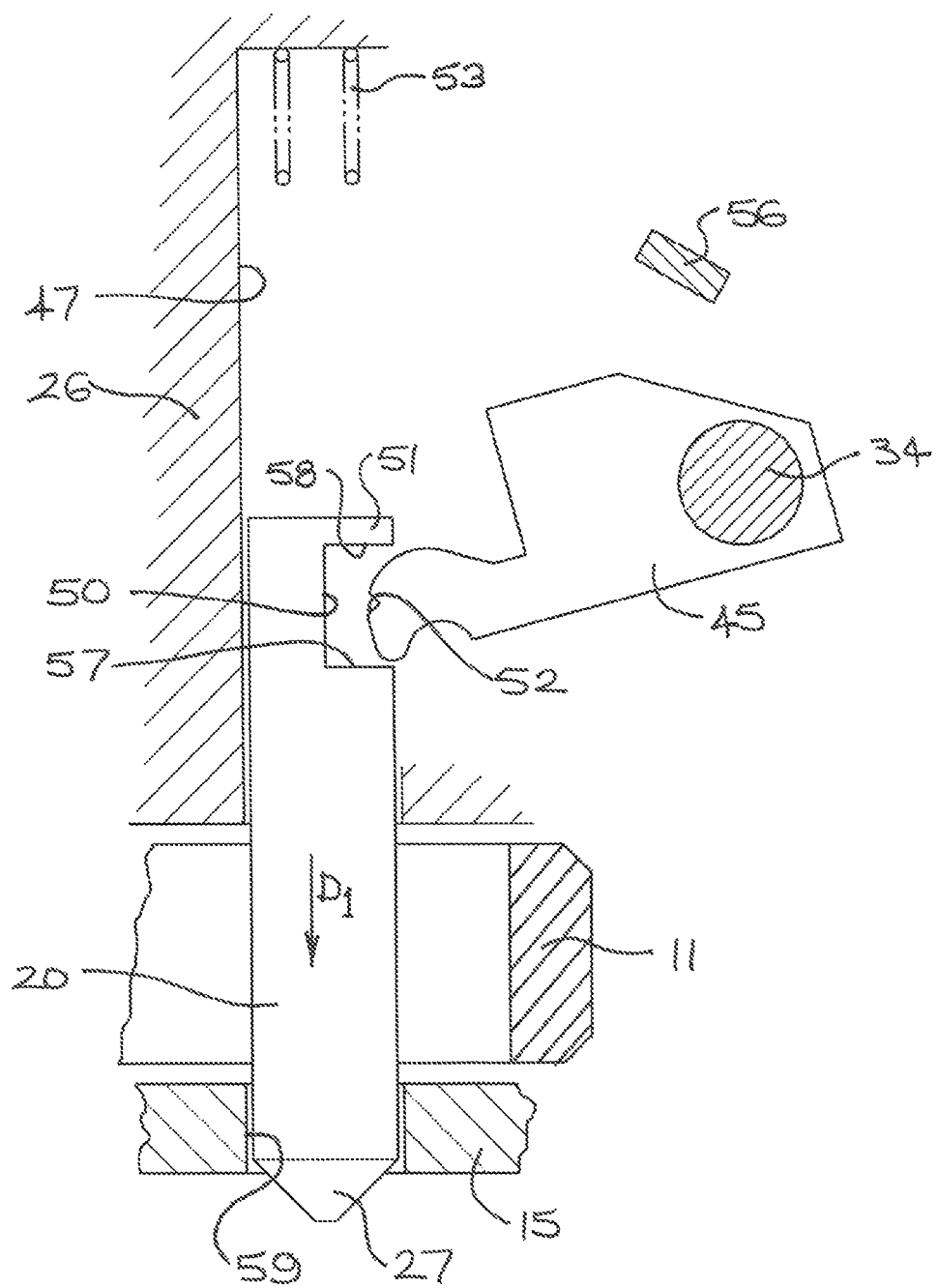

With reference to the sequence of movement shown in FIGS. 5 to 7, the pin 20 and a drive member 45 are illustrated. The drive member 45 forms part of a retracting and driving arrangement, of which the actuating arm 31 also forms a part. For the description of FIGS. 5 to 7, it should be understood that the actuating arm 31 is connected to the drive member 45 by connection of the arm section 34 to the distal end 46 of the member 45. The section 34 is rigidly connected to the member 45, so that rotation of the arm 31 causes rotation of the member 45. That connection can be a threaded connection, or it can be by welding or by configuring the cross-section of the arm section 34 to be non circular and fitting into a non circular opening in the member 45.

The pin 20 is elongate and is closely mounted within a bore 47 within the housing 26. By this arrangement, the pin 20 is constrained to movement along its lengthwise axis.

In FIG. 5, the pin is shown in the retracted position, in which the leading end 27 only just extends out of the bore 47. This small extension out of the bore 47 is deliberate, as movement of the pin 20 to the release position is dependent on the leading end 27 being engaged by the eye 11 and as a result of that engagement, the pin 20 being shifted a small distance in the direction D2 (FIG. 6) into the bore 47.

The spring 53 of FIG. 5 (see FIG. 4 also) biases the pin 20 in the direction D1, but that biasing influence is only light and is exerted on the pin 20 when the pin 20 is at or close to the retracted position shown in FIG. 5. The spring 53 operates to maintain the connection between the arm 45 and the pin 20 (noting that the arm 45 is biased clockwise in FIG. 5 by the actuating arm 31 on which the spring 40 acts), so that that connection is not disengaged through vibration, such as when a boat is being trailed by a vehicle.

The spring 53 is connected to the end cap 25, which removably closes the open end of the housing 26.

In FIG. 5, the pin 20 and the arm 45 are connected by engagement between the end wall 51 of the recess 50 within the recess 52 formed at the distal end of the arm 45. The arrangement is such that the arm 45 is not able to rotate while the end wall 51 is engaged within the recess 52 because the arm 45 is effectively jammed with the pin 20. This is because for the arm 45 to rotate anti-clockwise, the pin has to shift laterally, but it is restrained against that movement by its location within the bore 47. Because the arm 45 cannot rotate, the pin 20 cannot be driven toward the extended position of FIG. 7. The pin 20 is thus effectively restrained against movement in the direction D1. Accordingly, for the pin 20 to move to the extended position, the connection between the end wall 51 and the recess 52 must be disconnected which will thereafter permit the arm 45 to rotate anti-clockwise. This is achieved as follows.

With the pin 20 retained in the retracted position shown in FIG. 5, the eye 11 can be introduced into the jaw 15, between the jaw arms 16. However, the gap G shown in FIG. 5 is not sufficient to allow the eye 11 to pass into the opening 18 of the jaw 15 without the eye 11 engaging the leading end 27 of the pin 20. The eye 11 thus engages the leading end 27 against the side surface 54 and causes the pin 20 to be pushed slightly into the bore 47 of the housing 26. The pin 20 is thus shifted by that engagement to the release position.

The movement of the pin 20 described above causes the pin 20 to move relative to the arm 45 against the bias of the spring 53, because the arm 45 is not able to rotate clockwise any further than that shown in FIG. 5. This constraint of the arm 45 against further rotation can be achieved in any suitable manner such as by a suitable stop 56 that the arm 45 engages at the maximum point of rotation or simply by the anti-clockwise bias load imposed on the arm 45 by the spring 40.

Movement of the pin 20 relative to the arm 45 causes disconnection of the end wall 51 from the recess 52 as shown in FIG. 6. Following that disconnection, the arm 45 can rotate anti-clockwise under the biasing influence of the spring 40 and because the pin 20 is no longer restrained against movement in the direction D1, the arm 45 can drive the pin 20 to the extended position shown in FIG. 7 as follows. Once the end wall 51 has been disconnected from the recess 52, the distal end of the arm 45 can move into the recess 50 to allow full rotation of the arm 45. The arm 45 drives the pin 20 by engagement with the recess surface 57, rolling on that surface as the pin 20 moves in the direction D1.

Movement of the pin 20 from the release position shown in FIG. 6 to the extended position shown in FIG. 7 can be extremely quick depending on the biasing load applied by the spring 40 to the actuating arm 31 and thus to the drive arm 45. Extremely quick movement is preferred, so that the eye 11 is captured almost as soon as it enters the jaw 15.

By the arrangement discussed above, the eye 11 has been captured in the jaw 15, so that the boat to which the eye 11 is attached is secured to the trailer to which the boat coupling 10 is attached.

When the eye 11 is to be released from the jaw 15 for launching a boat from a trailer, the actuating arm 31 is rotated clockwise to rotate the drive arm 45 clockwise, in order to drive the pin 20 in the direction D2 until the eye 11 can clear the pin 20 and withdraw from the jaw 15. The drive member 45 will drive against the surface 58 of the recess 50 as shown in FIG. 7 to push the pin 20 into the bore 47 in the direction D2. Rotation of the actuating arm 31 clockwise is against the biasing influence of the spring 40.

Once the eye 11 has withdrawn from the jaw 15, the pin 20 can return to the extended position of FIG. 7 or can be reset to the retracted position of FIG. 5. It is to be noted that if the pin 20 is driven to the retracted position of FIG. 5 to allow withdrawal of the eye 11 from the jaw 15, the eye 11 will engage the leading end 27 of the pin 20 during movement out of the jaw 15, which will push the pin 20 to the release position. This will allow the pin to return to the extended position after the eye 11 has cleared the jaw 15 unless the operator returns the pin 20 to the retracted position by rotation of the arm 31.

When it is time to remount the boat on the trailer, the pin is driven to the retracted position by rotation of the arm 31 and the boat can be driven to a position in which the eye 11 is aligned for insertion to the jaw 15. As the eye 11 enters the jaw 15, it will engage the side surface 54 of the leading end 27 of the pin 20, causing the pin 20 to move in the direction D2 (FIG. 6), and releasing the retaining connection between the end wall 51 and the recess 52 as described earlier. With that connection released, the pin 20 can be driven by the drive member 45 to the extended position of FIG. 7 and the eye 11 and therefore the boat to which the eye 11 is attached, is again secured to the coupling 10.

Advantageously, the boat coupling 10 can be arranged to provide an audible click when the pin 20 has reached either or both of the retracted and extended positions. In the retracted position, the audible click can occur when the end wall 51 is received within the recess 52. That indicates to the operator that the retracted position of the pin 20 has been reached and the arm 31 can be released. In the extended position, the leading end 27 of the pin 20 can engage in an opening 59 in the jaw 15 to create the audible click so that the boat driver receives an audible indication that the eye 11 is properly secured to the coupling 10. Other arrangements to produce an audible click are within the scope of the invention.

Figure 8:
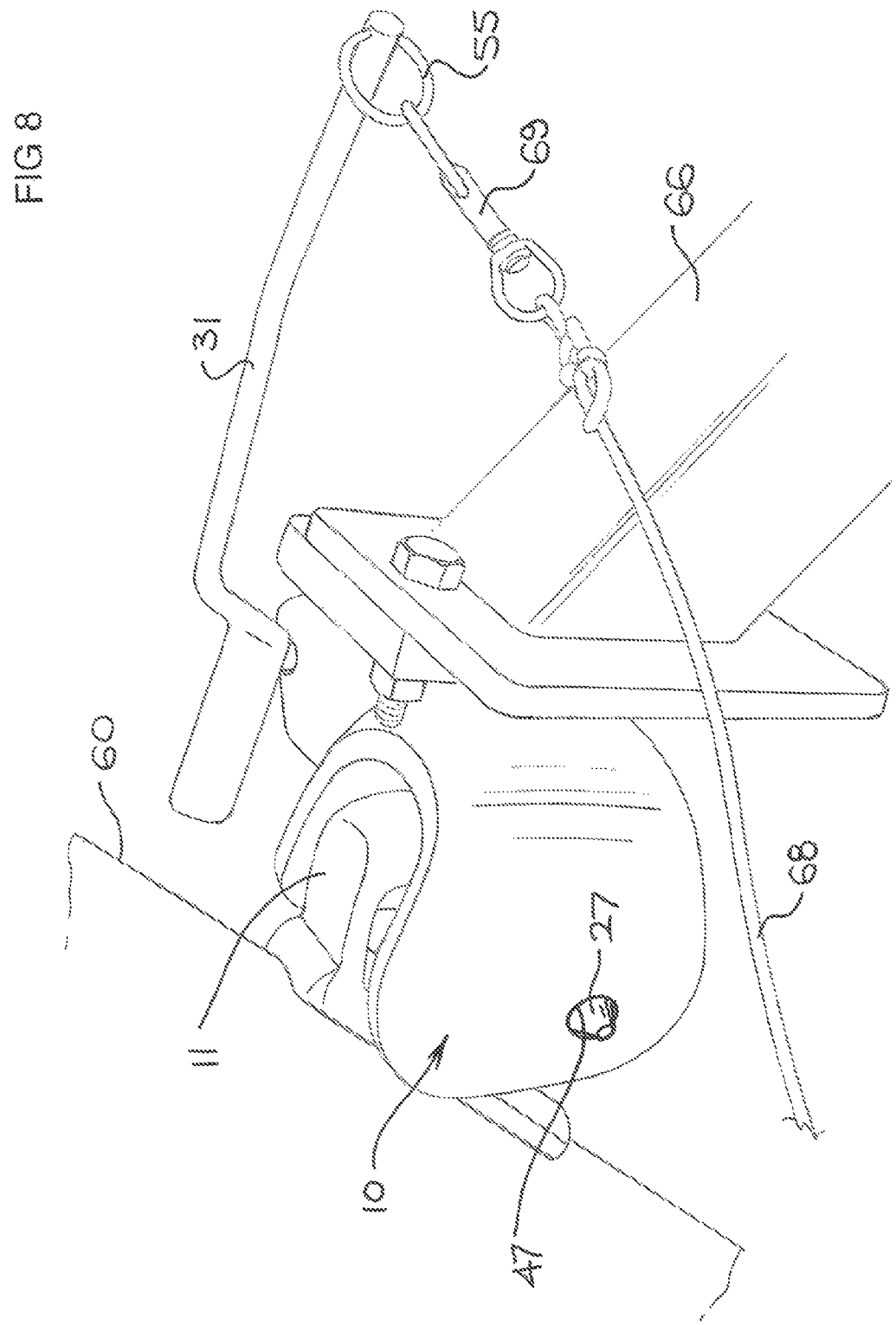

FIGS. 8 and 9 illustrate the bow 60 of a boat 61 which is secured by the coupling 10 to a trailer 62. The trailer 62 includes the normal winch 62, which can be secured to an eye 64, and rollers 65 or a V-block, which engage either side of the bow 60. The coupling 10 is secured to a member 66, which is secured to a trailer bow post 67.

A ring 55 (see also FIGS. 1 to 4) is secured to the end of the arm 31 and a flexible cord or rope 68 is secured to the ring 55 via a clip 69. The rope 68 extends towards the rear of the boat for access by the boat driver 70, whereby a pull on the rope 68 rotates the arm 31 to release the pin 20 from the eye 11, so that the boat can slip or be driven off the trailer 62. Thus, it will be apparent that the coupling 10 can be remotely operated so that the boat driver can remain in the driving position to release the boat from the trailer 62. The rope could equally extend to the driver of the car which is towing the trailer, or even to a bystander for remote operation.

The boat coupling 10 provides significant operating advantages, and in particular, it enables the boat driver to release the eye 11 from the coupling 10 from a position within the boat. That is, the operator does not need to be actually at the coupling 10. Thus, a boat which is trailed to a launch site with the pin in the extended position shown in FIG. 7, capturing the eye 11 within the jaw 15, can be released from the trailer by retracting the pin 20 remotely by pulling on the arm 31 through the rope 68 to withdraw the pin 20 to the retracted position of FIG. 5. The boat can then be reversed off the trailer in the usual manner.

The coupling 10 has minimum component parts but is robust and is expected to be relatively maintenance free and importantly, requires no lubrication. Each of the housing 26 of the coupling 10, the pin 20 and the drive member 45 can be cast without further significant machining, thus minimising the cost of production. The coupling 10 is compact and therefore is easy to fit into the restricted area at the bow region of the trailer (see FIG. 8). The coupling 10 eliminates the need for a safety chain as a secondary safety device to the winch. Advantageously, the eye is not generally in contact with the coupling so that there is generally no wear of the coupling during trailing of a boat and there is generally no loading applied to the boat through the eye during trailing. A particular advantage is that the coupling 10 can be operated from positions within a boat or a car or truck, so that there is no need to be actually at the coupling for its operation. Other latching devices have to be set or switched for launch when the boat is nearly in the water, because those latching devices are not sufficiently secure for holding a boat to a trailer even for short distances. With the coupling 10, the winch can be disconnected from the boat well away from the water because the coupling will hold the boat securely for the remaining distance to the water. The trailer can be driven straight into the water and the coupling released by the boat driver without either the boat or vehicle driver having to move from their driving positions.

The invention described herein is susceptible to variations, modifications and/or additions other than those specifically described and it is to be understood that the invention includes all such variations, modifications and/or additions which fall within the spirit and scope of the above description.

Future patent applications may be filed in Australia or overseas on the basis of or claiming priority from the present application. It is to be understood that the following provisional claims are provided by way of example only, and are not intended to limit the scope of what may be claimed in any such future applications. Features may be added to or omitted from the provisional claims at a later date so as to further define or re-define the invention or inventions.

The claims defining the invention are as follows:

1. A boat coupling including:
   a jaw for receiving an eye which is attached to the hull of a boat;
   a pin which is movable between an extended position in which it bridges across the jaw to capture the eye and a retracted position in which the jaw is open for release of the eye; and
   a retaining arrangement for retaining the pin in the retracted position, the retaining arrangement releasing the pin upon the pin being shifted to a release position whereafter the pin is movable under a biasing influence to shift to the extended position;

wherein the jaw defines an opening into which the eye is received for capture by the pin and in the retracted position of the pin, a leading end of the pin extends into the opening and presents a surface for engagement by the eye as the eye enters the opening, the surface being shaped so that upon engagement by the eye, the pin is shifted to the release position.

2. A boat coupling according to claim 1, the pin being elongate and defining a lengthwise axis, the pin being movable between the retracted position and the extended position along the lengthwise axis, wherein the pin is shifted to the release position from the retracted position along the lengthwise axis thereof in a direction opposite to the direction of movement of the pin from the retracted position to the extended position.

3. A boat coupling according to claim 2, wherein the pin is shifted to the release position against the influence of a bias arrangement.

4. A boat coupling according to claim 1, further including a retracting arrangement for retracting the pin to the retracted position, the retracting arrangement including a drive member for engaging the pin and for driving the pin from the extended position to the retracted position.

5. A boat coupling according to claim 4, the drive member being rotatable about an axis which extends perpendicular to the lengthwise axis of the pin to drive the pin from the extended position to the retracted position.

6. A boat coupling according to claim 5, the drive member being connected to an actuator to drive the drive member to rotate.

7. A boat coupling according to claim 6, the actuator being formed as an arm.

8. A boat coupling according to claim 4, the drive member forming part of the retaining arrangement and the drive member engaging the pin in the retracted position to retain the pin in the retracted position.

9. A boat coupling according to claim 4, wherein the drive member is biased to rotate in a direction to drive the pin toward the extended position and the drive member is coupled to the pin so that upon the pin being shifted to the release position, the drive member drives the pin to the extended position.

10. A boat coupling according to claim 1, wherein in use the axis of the pin is substantially horizontal.

11. A boat trailer including a boat coupling according to claim 1.

12. A boat coupling according to claim 1, the leading end of the pin presenting an inclined surface for engagement by the eye.

13. A boat coupling according to claim 1, the leading end of the pin presenting a conical surface for engagement by the eye.

14. A boat coupling according to claim 6, the actuator being rotatable about the axis of the drive member.

15. A boat coupling according to claim 8, the pin and the drive member being jammed together in the retracted position of the pin and being released from jamming upon the pin being shifted to the release position.

16. A boat coupling according to claim 5, the drive member forming part of the retaining arrangement and the drive member engaging the pin in the retracted position to retain the pin in the retracted position, the pin and the drive member being jammed together in the retracted position of the pin whereby the drive member is jammed against rotation and the drive member being released from being jammed against rotation upon the pin being shifted to the release position whereafter the drive member is rotatable under a biasing influence to drive the pin towards the extended position.

* * * * *